Oct. 17, 1950     J. B. SCHUYLER     2,526,285
CLOTHES SUPPORTING RACK
Filed April 2, 1949
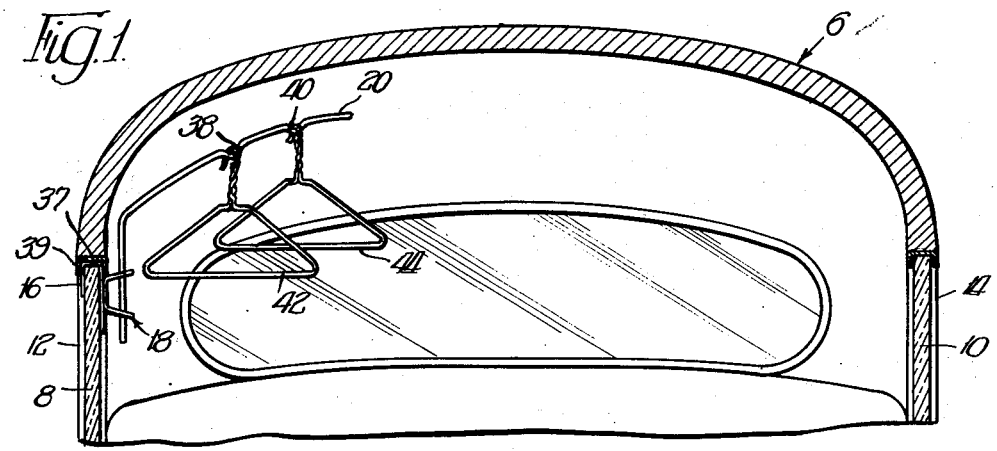
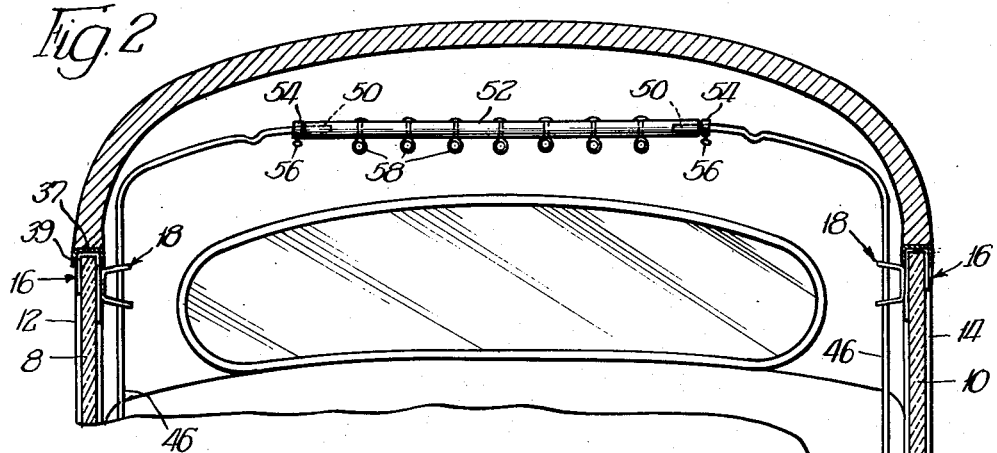
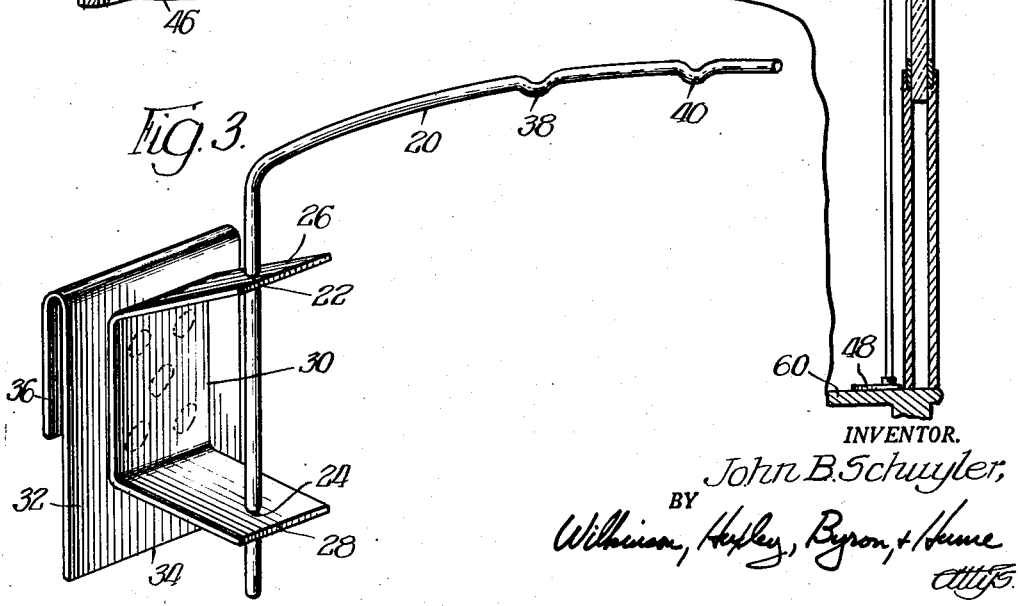
INVENTOR.
John B. Schuyler,
BY Wilkinson, Huxley, Byron + Hume
ATTYS.

Patented Oct. 17, 1950

2,526,285

UNITED STATES PATENT OFFICE 2,526,285

CLOTHES SUPPORTING RACK

John B. Schuyler, Marquette, Mich.

Application April 2, 1949, Serial No. 85,089

4 Claims. (Cl. 224—42.1)

This invention relates to a portable clothes supporting rack particularly adapted for use in vehicles such as passenger automobiles. More specifically, this invention relates to a clothes supporting rack which is adapted to cooperate with one or more of the adjustable windows of such a vehicle.

Numerous devices have been designed for carrying clothing in a passenger automobile without removing the clothing from the hangers upon which it is normally disposed when stored in a closet or the like. One disadvantage of most of these devices is that they permit hanging of the clothes only in a manner which does not allow them to fall free of the seats of the vehicle. For example, the usual provision, if any, in passenger automobiles for the hanging of clothes or the like is a small hook of very limited capacity located adjacent the rear upper corner of each rear door of the vehicle. This disposition of such a hook normally places it directly above the front edge of the rear seat and, since the hook or other device is also normally mounted on the side wall of the vehicle, it is impossible to dispose hangers having clothing thereon in any way other than that which causes the hangers to be disposed in a plane substantially parallel to the side wall of the vehicle.

This in turn causes any clothing which is of any considerable length to come into contact with the rear seat in such a way so as to be materially disarranged thereby.

In addition, it is normally impossible to place the hangers which support the items of clothing, at the most advantageous level, and therefore a considerable amount of hanging space is lost. The most desirable arrangement from this point of view would be to have the hangers supported adjacent to the ceiling of the vehicle so as to take advantage of substantially all of the vertical distance available between the ceiling and floor of the vehicle.

It is therefore an object of this invention to provide an improved portable clothes supporting rack adapted for use particularly in passenger vehicles. It is also an object of this invention to provide a supporting rack which permits the clothes to be hung in a plane substantially perpendicular to the line of movement of the vehicle, so that they may hang free of the rear seat. An additional object is to provide a clothes supporting rack of the character described which permits the utilization of the maximum hanging space available in the vehicle and which is readily adjustable in a vertical direction.

Still another object of this invention is to provide a device of the character described which is adapted to be disposed in supported association with the upper edge of one or more of the movable side windows of the vehicle so that no modification is necessary for installation and yet which does not prevent the full closing of the window or windows involved. It is also an object of this invention to provide a clothes supporting rack which is adjustable to any vehicle having movable side windows and which can be readily installed by merely lowering and raising one or more of the windows of the vehicle. It is a further object to provide a rack of the character described which, when disposed in operative position, is firmly anchored both by the upper edge of the window or windows and also by the channel adapted to normally receive that upper edge. A final object is to provide a device of the character described which may readily be constructed so that it is adapted for use with only a relatively few articles of clothing or may be conveniently expanded into a rack capable of carrying a relatively large amount of clothing safely and conveniently, and yet which has a relatively simple and inexpensive construction and only a comparatively few separate components.

Further objects and advantages of this invention will become evident as the description proceeds and from an examination of the accompanying drawing which illustrates one embodiment of the invention and in which similar numerals refer to similar parts throughout the several views.

In the drawing—

Figure 1 is a fragmentary view in vertical cross-section of the rear portion of a passenger vehicle and one embodiment of this invention shown in supported association with the upper edge of one of the side windows of said vehicle;

Figure 2 is a fragmentary view in vertical cross-section of the rear portion of a passenger vehicle and an alternative embodiment of this invention shown in supported association with the upper edges of two of the side windows of said vehicle; and Figure 3 is an enlarged perspective view of the device shown in Figure 1 which embodies this invention.

Referring now to Figure 1, the rear portion of a passenger vehicle, indicated generally by the numeral 6, is shown in vertical cross-section, a fragmentary portion of the two rear side windows 8 and 10 being shown which are in turn mounted in the two door frames 12 and 14 respectively. The device which embodies this invention is shown disposed in supported association with the upper edge of window 8 and comprises the supporting bracket 16, which has secured thereto the substantially U-shaped adjustable clamping device 18 which is adapted to support the clothes supporting arm 20, as shown in Figures 1 and 3.

Referring now to Figure 3, the arm 20 is adapted to be received by the holes 22 and 24 in the two arms 26 and 28 of the clamping device 18 respectively. The base 30 of the U-shaped clamping device 18 is secured to the outer face 32 of the longer arm 34 of the substantially L-shaped supporting bracket 16 by any suitable means, such as spot welding. The shorter arm 36 of the supporting bracket 16 is substantially parallel to the arm 34 and forms therewith a narrow channel adapted to receive the upper edge of the window 8, as shown in Figure 1.

The bracket 16 is formed of any suitable stock which is thin enough as not to interfere with the proper closing of window 8 when it is moved to its uppermost position, as shown in Figure 1. As shown in Figure 1, the channel 37 in the upper portion of the door frame has a resilient liner 39 in which the upper edge of the window 8 is normally received when the window is closed. When the supporting bracket 16 is engaged with the upper edge of the window 8 in the manner shown in Figure 1, it also is received by the channel 37 when the window is disposed in the uppermost position. This disposition of the bracket 16 causes it to be very firmly seated on the window and also allows the channel 37 to bear a great portion of the strain that would normally be carried by the window glass 8. Since the window will normally be closed during operation of the vehicle when the hanging device is in place, the strain borne by the window will be relatively small at the times when abnormal forces are most likely to be created.

Applicant has utilized a hanger of the character illustrated in Figure 1 during many thousands of miles of travel, carrying approximately 14 pounds of clothing, and has had no difficulty whatsoever with its operation. Stainless steel has been found to be a very suitable material from which to form both the supporting bracket 16 and the clamping device 18. The two arms 26 and 28 of the clamping device 18 should have a resiliency which allows the arms to be compressed toward each other, but of a character such that the supporting rod 20 is normally held under considerable pressure, since holes 22 and 24 are so disposed in the arms 26 and 28 that they are axially aligned only when said arms are so compressed. It is from this characteristic of the holes 22 and 24, together with the resiliency of the arms 26 and 28 that the holding action of the clamping device 18 is attained. When it is desired to adjust the position of the supporting rod 20, it is only necessary to compress with the fingers the two arms 26 and 28 which will then allow the supporting rod 20 to be shifted longitudinally in the holes 22 and 24, and when a suitable position is reached, the pressure on the arms 26 and 28 may then be released. The supporting rod 20 will then be held securely in the selected position.

As shown in Figure 1, configuration of the supporting rod 20 may be altered at several points to form areas in the rod particularly adapted to receive and hold clothes hangers, such as the areas 38 and 40. The hangers 42 and 44 are shown disposed in cooperative association with the two rod areas 38 and 40 in Figure 1. Such an arrangement prevents the hangers from moving longitudinally on the rod 20 under normal conditions.

Also, as shown in Figure 1, the hook portion of the hangers 42 and 44 can be readily twisted out of its normal position so that it lies in a plane substantially perpendicular to the plane of the main body of the hanger. This in turn permits the main body of the hangers to be normally disposed in a plane which is substantially perpendicular to the line of movement of the vehicle. It therefore can be seen that any clothing hung on the supporting rod 20 on hangers 42 and 44, having the hook portions thereof so disposed, will tend to maintain a position which is also substantially perpendicular to the line of movement of the vehicle. This characteristic of the device embodying the invention is particularly significant, since it permits the disposition of the clothing in such a manner as to hang free of the rear seat of the vehicle, which is a great advantage in avoiding undesirable mussing or wrinkling of the clothing while hanging in the car.

When it is desired to use the rack shown in Figures 1 and 3, the door having supporting window selected may be opened and the window lowered sufficiently to allow the supporting bracket 16 to be slipped over the upper edge of the window. The height of the window and the position of the rod 20 with respect to the bracket 16 may then be adjusted, the position of the rod being changed by proper operation of the clamping device 18. The rod 20 should then be at a height which will permit it to swing into the interior of the vehicle when the door is closed. The rack may then be loaded, the door closed, and the height of the rod 20 again adjusted if necessary to cause the supported clothing to clear the floor of the vehicle. When it is desired to unload the rack, the reverse procedure may be followed.

Referring now to Figure 2, another embodiment of this invention is illustrated therein, which utilizes two supporting brackets 16—16, each having an adjustable clamping device 18 associated therewith. One of the supporting brackets 16 is disposed in supported association with the upper edge of each of the windows 8 and 10, as shown in Figure 2. Each of the clamping devices 18 is in turn adapted to receive, and adjustably support, a supporting rod 46 having a configuration similar to the supporting rod 20 previously described. The supporting rods 46—46 differ principally from the rod 20 in that the portion thereof adapted to be supported in a substantially vertical position is of considerably greater length, and have secured thereto at their lower ends the plates 48—48, by any suitable fastening means. The upper ends 50—50 of the supporting rods 46—46 are in turn adapted to be received by the ends of a hollow rod or elongated sleeve 52. The adjustable collars 54—54 may be provided which may be adjustably secured to the ends 50—50 of the supporting rods 46—46 at the desired points by operation of the set screws 56—56. When so disposed, said collars prevent the sleeve 52 from being displaced from the position shown in Figure 2 and yet permit the easy removal of the sleeve when desired. The sleeve 52 may also be provided with a plurality of eyes 58 which are adapted to receive the hook end of wire clothes hangers, such as 42 and 44, shown in Figure 1.

The length of the lower portions of the rods

46—46 may be such that, by properly adjusting the position of the rods with relation to the clamping members 18—18, the base plates 48—48 will be disposed above the floor 60 of the vehicle when the windows 8 and 10 are in the closed position. If such an arrangement is followed, the rods 46—46 and the sleeve 52 will all be supported entirely by the supporting brackets 16—16 and the clamping means 18—18, which in turn cooperate with the channels 37—37 of the door frames 12 and 14.

If such an arrangement is provided, the rack may rest on the floor 60 of the vehicle while being loaded and either, or both, of the doors of the vehicle may be opened and closed at will, since the windows 8 and 10 will be normally lowered to a point which will allow them to clear the supporting bracket 16—16 while loading the rack. After the rack is loaded, as desired, the two windows 8 and 10 may be raised simultaneously, which will in turn cause the rods 46—46, and the sleeve 52, to be raised as a unit as soon as the upper edges of the windows 8 and 10 come into proper association with the supporting brackets 16—16. Both windows will then be raised as far as possible and the supporting brackets 16—16 will then be received along with the upper edges of the windows in the channel 37.

It may be preferable, however, to have the lower portions of the rods 46 of such a length that the base plates 48 are adapted to rest on the floor 60 of the vehicle at all times. If such is the case, the length of the rods 46 will be such that when the base plates 48 are so disposed on the floor 60 of the vehicle, the upper portions of the rods 46 and the sleeve 52 will be disposed adjacent the ceiling of the vehicle. With such an arrangement, the rack may be loaded as above described, and the normal operation of the doors of the car adjacent to the rack will be permitted if the windows 8 and 10 are lowered sufficiently and also if the position of the clamping devices 18—18 and the supporting brackets 16—16 is properly adjusted.

In other words, the windows 8 and 10 may be lowered and the brackets 16—16 adjusted to a suitable position which enables them to clear both the windows and the upper portion of the two door frames. After the rack is loaded as desired, the windows 8 and 10 may be raised individually and the associated supporting bracket and clamping device may also be adjusted as each window is raised so that the supporting bracket receives the upper edge of the window and is also moved upwardly into the channel 37 normally adapted to receive that upper edge. The ultimate result will be that the rack is supported by the base plates 48—48, but it will also be held in position by the operation of the two brackets 16—16 and the associated clamping devices 18—18.

If this latter form is used, it is only necessary to lower the window of the particular door which is to be opened in order to operate the latter satisfactorily. One advantage of this latter arrangement is that it is not necessary to lower both windows 8 and 10 to permit one of the doors to be opened, and, in addition, the rack remains undisturbed even though a window and door is opened.

It is obvious that much heavier loads of clothing can be satisfactorily carried by the form of the invention shown in Figure 2. Undoubtedly loads of at least 40 pounds could easily be carried. It is also obvious that the rods 46 could be formed so as to lend themselves to being used singly if desired, much in the manner of the rod 20 first described, and the combination, such as that shown in Figure 3, used only when desired.

The drawing and the above discussion are not intended to represent the only possible forms of this invention, in regard to details of construction. Changes in form and in the proportion of parts, as well as the substitution of equivalents are contemplated, as circumstances may suggest or render expedient, without departing from the spirit or scope of this invention as further defined in the following claims.

What is claimed is:

1. A portable clothes supporting rack for use in a vehicle having vertically adjustable windows, comprising a supporting bracket adapted to be disposed in supported relation with the upper edge of one of said windows, a pair of upstanding resilient clamping members disposed in angular relation to one another on said bracket, each said clamping member having a transverse bore therein, the axis of which is substantially normal to the surface of said clamping member, the outer extremities of said resilient clamping members being adapted to be compressed at will to move said clamping members into substantially parallel relation, a clothes supporting rod adapted to be inserted through said bores in said clamping members when the latter are so disposed in substantially parallel relation and to be locked therein when said clamping members are released, and an angularly disposed extremity on said rod adapted to be supported in close association with the roof of said vehicle and to carry a plurality of clothes hangers when said supporting rack is disposed in supported relation with one of said windows.

2. A portable clothes supporting rack for use in a vehicle having vertically adjustable windows, comprising a supporting bracket adapted to be disposed in supported relation with the upper edge of one of said windows, a pair of upstanding resilient clamping members disposed in angular relation to one another on said bracket, each said clamping member having a transverse bore therein, the axis of which is substantially normal to the surface of said clamping member, the outer extremities of said resilient clamping members being adapted to be compressed at will to move said clamping members into substantially parallel relation, a clothes supporting rod adapted to be inserted through said bores in said clamping members when the latter are so disposed in substantially parallel relation and to be locked therein when said clamping members are released, an angularly disposed extremity on said rod adapted to be supported in close association with the roof of said vehicle and to carry a plurality of clothes hangers when said supporting rack is disposed in supported relation with one of said windows, and a base plate secured to the opposite extremity of said rod adapted to rest on the floor of said vehicle.

3. A portable clothes supporting rack for use in a vehicle having vertically adjustable windows, comprising a pair of supporting brackets adapted to be disposed in supported association with the upper edges of oppositely disposed windows in said vehicle, each said supporting bracket having a pair of upstanding resilient clamping members disposed in angular relation to one another thereon, each said clamping member having a transverse bore therein, the axis of which is substantially normal to the surface of said clamping member, the outer extremities of said resilient clamping members being adapted to be compressed at will to move said clamping members into substantially parallel relation, a clothes supporting rod adapted to be inserted through said bores in each said clamping members when the latter are so disposed in substantially parallel relation and to be locked therein when said clamping members are released, an angularly disposed extremity on each said rod adapted to be supported in close association with the roof of said vehicle, a sleeve adapted to receive the angularly disposed extremity of each said rod, and means for securing said sleeve against longitudinal movement relative to said rods.

4. A portable clothes supporting rack for use in a vehicle having vertically adjustable windows, comprising a pair of supporting brackets adapted to be disposed in supported association with the upper edges of oppositely disposed windows in said vehicle, each said supporting bracket having a pair of upstanding resilient clamping members disposed in angular relation to one another thereon, each said clamping member having a transverse bore therein, the axis of which is substantially normal to the surface of said clamping member, the outer extremities of said resilient clamping members being adapted to be compressed at will to move said clamping members into substantially parallel relation, a clothes supporting rod adapted to be inserted through said bores in each said clamping members when the latter are so disposed in substantially parallel relation and to be locked therein when said clamping members are released, an angularly disposed extremity on each said rod adapted to be supported in close association with the roof of said vehicle, a sleeve adapted to receive the angularly disposed extremity of each said rod, means for securing said sleeve against longitudinal movement relative to said rods, and a base plate secured to the opposite extremity of each said rod adapted to rest on the floor of said vehicle.

JOHN B. SCHUYLER.

REFERENCES CITED

The following references are of record in the file of this patent:

UNITED STATES PATENTS

| Number | Name | Date |
| --- | --- | --- |
| 599,871 | Siefkes | Mar. 1, 1898 |
| 888,032 | Peterson | May 19, 1908 |
| 1,260,206 | Kent | Mar. 19, 1918 |
| 1,692,679 | McGoogan | Mar. 20, 1928 |
| 1,696,579 | Miller | Dec. 25, 1928 |
| 2,144,772 | Plants | Jan. 24, 1939 |
| 2,344,339 | Zwald | Mar. 14, 1944 |
| 2,472,132 | Walker | June 7, 1949 |
| 2,478,337 | Strasser et al. | Aug. 9, 1949 |